Feb. 11, 1930.                D. MEINEN                 1,746,270
                            GATE OPERATOR
                     Filed May 25, 1929       2 Sheets-Sheet 1

Inventor
D. Meinen

By Clarence A. O'Brien
                Attorney

Feb. 11, 1930.     D. MEINEN     1,746,270
GATE OPERATOR
Filed May 25, 1929     2 Sheets-Sheet 2
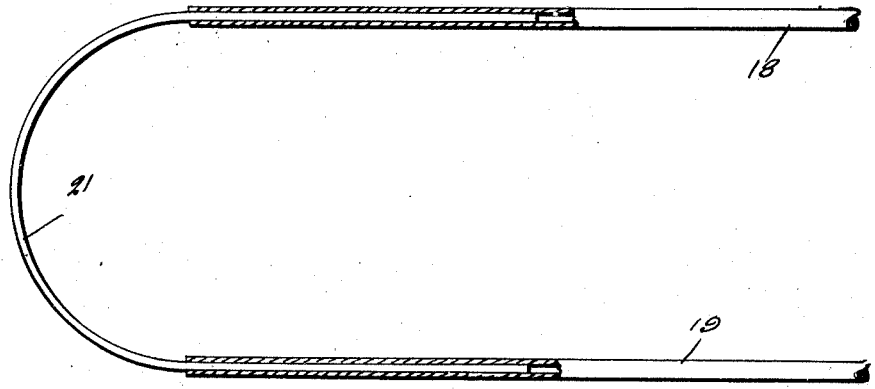
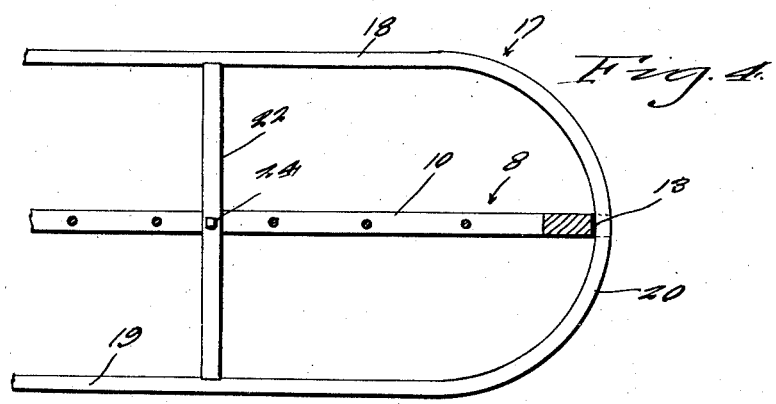
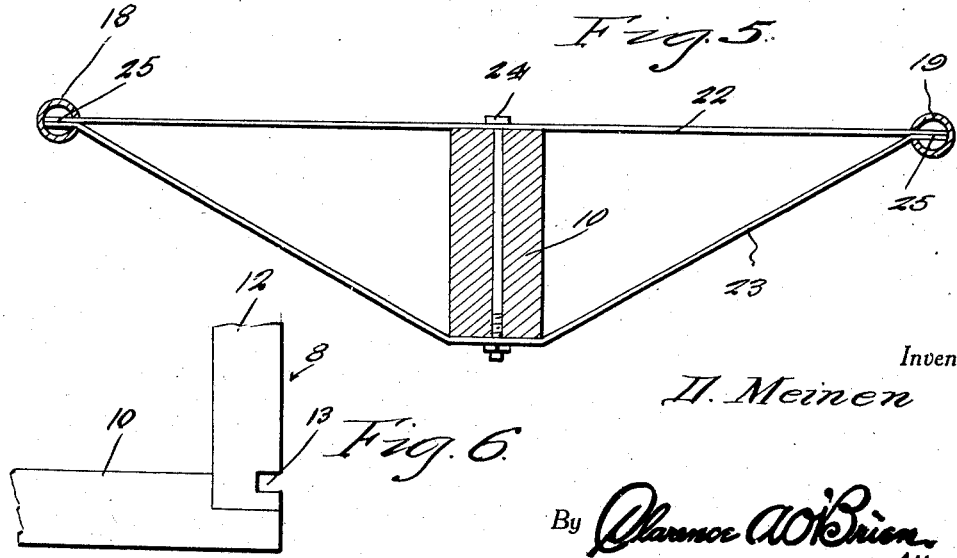
Inventor
D. Meinen
By Clarence A. O'Brien
Attorney Patented Feb. 11, 1930

1,746,270

UNITED STATES PATENT OFFICE

DIEDRICH MEINEN, OF WARRENTON, TEXAS

GATE OPERATOR

Application filed May 25, 1929. Serial No. 365,854.

This invention relates to an improved closure operating device which may be more specifically defined as a gate operator and it has more particular reference to a structure which is especially adapted to be used in association with a pair of freely swingable farm gates or the like.

The purpose of the invention is to provide a dependable means for permitting the gates to be kept open by the driving action of the wheels of an automobile or similar vehicle, whereby to obviate the necessity of alighting and opening the gates by hand as is usually done.

In carrying the invention into effect, I have found it sufficient and expedient to employ a pair of duplicate bumpers which are attached horizontally to the lower end portion of the gates and arranged and otherwise constructed to permit the production of a cam like action when the vehicle wheels come into engagement therewith, whereby to permit the vehicle to be driven against the gates in a manner to swing them to open position to permit unobstructed passage of the vehicle.

The specific details and method of attachment will become more readily apparent from the following description and drawings.

In the drawings:

Figure 3 is an enlarged sectional end view of one end of a bumper.

Figure 4 is a similar view of the opposite end portion showing the method of attachment of the gate.

Figure 5 is a transverse section taken approximately upon the plane of the line 5—5 of Figure 2.

Figure 6 is a detail view of the lower corner portion of one of the gates.

Figure 1:
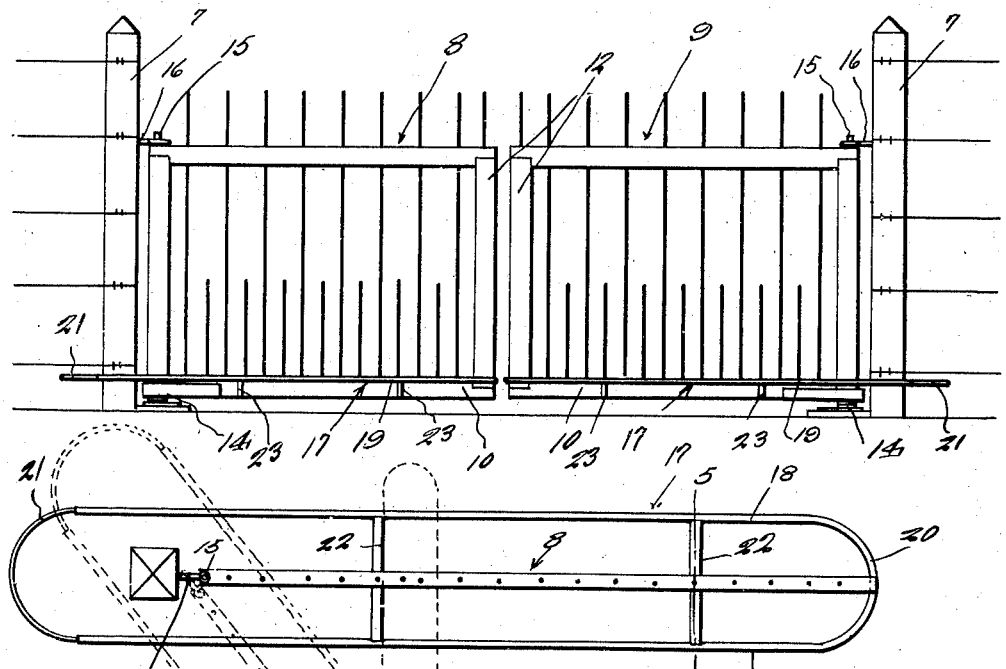
Figure 1 is an elevational view of a double farm gate structure with the gates equipped with the improved gate opening devices.

As seen in Figure 1, the reference character 7 designates fence posts and 8 and 9 designate generally the freely swingable gate located therebetween. This gate may be of any appropriate construction. Each gate is here shown as composed of a rectangular frame having suitable pickets mounted thereon. The lower bar of the frame is distinguished by the reference character 10 and the front bar by the reference character 12. These two parts are mentioned in that they cooperate directly with the invention. It is to be noted from Figure 5 that the front bar is provided with a notch 13 which constitutes a keeper seat which functions in a manner to be hereinafter described.

The lower end portion of the gate is pivotally mounted on an appropriate base as at 14, in Figure 1 and a return spring is provided for maintaining the gate normally closed. The upper end of the gate carries a journal pin or pintle 15, extending through an eye in a connecting bolt 16 on the adjacent post.

Figure 2:
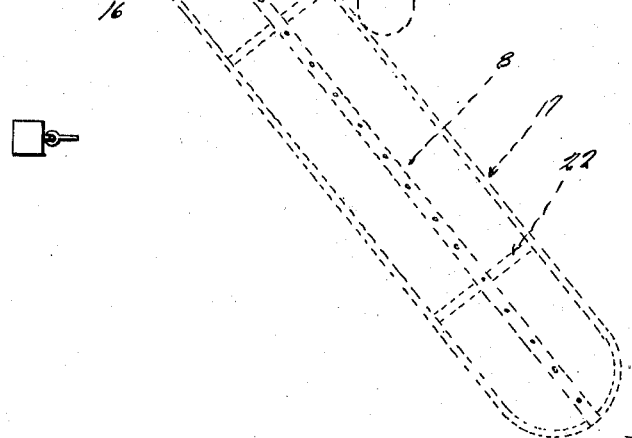
Figure 2 is a top plan view of approximately one-half of the structure appearing in Fig. 1.

The device on each gate is of the same construction and a description of one will suffice for both. As before stated, the device is broadly in the form of a substantially ovate buffer, generally designated by the reference character 17. This buffer as seen in Figure 2 comprises an elongated U-shaped part or body whose arm portions 18 and 19 function as runners or rails. The curvate or bight portion 20 is seated in the keeper notch 13. The arms are of tubular form and accommodate the end portion of a removable arch 21 at the left hand end. This arch is removable to facilitate placement of the bumper when applying it to the gate.

It is to be observed from Figure 2 that the bumper is of a size to permit it to surround the gate in spaced relation, and to dispose the runner forming arms 18 and 19 in a position spaced from the gate to permit the desired cam action utilized in forcing the gates open.

The bumper may be attached to the gates in any suitable manner, for instance, as seen in Figure 4, the bottom bar 10 of the gate is provided with one or more pairs of braces. There is a top brace 22 and a bottom brace 23. These are fastened at their intermediate portions to a bolt 24, carried by the gate member 10. The opposite end portions of these braces come together as indicated at 25 and extend into and through openings in the arms of the bumper.

It is understood that these bumpers are attached to the gates in a horizontal plane and adjacent the bottom of the gate. The bight portion 20 is seated in the notch 13 and the arms or runners 18 and 19 straddle the gate in spaced parallelism. That end portion carrying the removable arch 21 embraces the adjacent post.

With this arrangement, it is obvious that by driving the vehicle against the gate, the wheels will come into contact with the runners on one side, for instance as indicated in dotted lines in Figure 2. Thus, the wheels will literally ride along the runners, producing a cam spreading action and forcing the gate apart and to open position.

This arrangement affords a simple and inexpensive structure capable of application to farm gates and efficiently operable in producing the desired gate opening operation.

The devices are susceptible of easy application by unskilled hands and no alterations in the existing details of the gates are required.

A careful consideration of the description in conjunction with the drawings will enable the reader to obtain a clear understanding of the construction and features and advantages of the invention. Therefore a more lengthy description is regarded as unnecessary.

Minor changes in the shape, size and rearrangement of details coming within the field of invention claimed may be resorted to, in actual practice, if desired.

I claim:

1. In a structure of the class described, in combination, a gate post, a gate swingably mounted on said post, and a longitudinally elongated ovate bumper embracing the gate and post to provide spaced parallel wheel runners.

2. A gate opening device in the form of an attachment comprising a longitudinally elongated substantially ovate frame, and means for attaching said frame to a gate comprising upper and lower braces whose intermediate portions are adapted to be fastened to the base member of the gate frame to dispose side members of said ovate frame in outwardly spaced relation from the gate to function as wheel runners.

3. A gate opening device in the form of an ovate frame comprising a substantially U-shaped body portion including a curvate bight and spaced parallel arms constituting runners, said arms being of tubular form, and an arch shaped end member having its end portions telescopically fitted into said arms.

4. A gate opening device in the form of an ovate frame comprising a substantially U-shaped body portion including a curvate bight and spaced parallel arms constituting runners, said arms being of tubular form, and an arch shaped end member having its end portions telescopically fitted into said arms, together with a pair of bracing and attaching members comprising an upper brace member and a lower brace member disposed in superposed relationship and having their end portions brought together and extended through openings in said arms.

In testimony whereof I affix my signature.

DIEDRICH MEINEN.